No. 633,667. Patented Sept. 26, 1899.
C. L. TAYLOR.
CLUTCH FOR HOISTING MACHINES.
(Application filed June 19, 1899.)
(No Model.) 3 Sheets—Sheet 3.
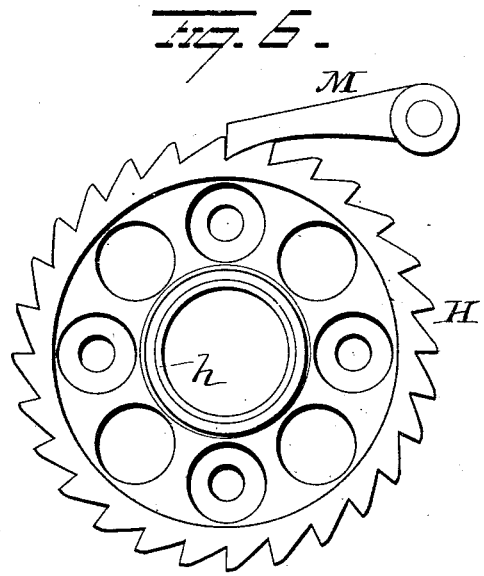
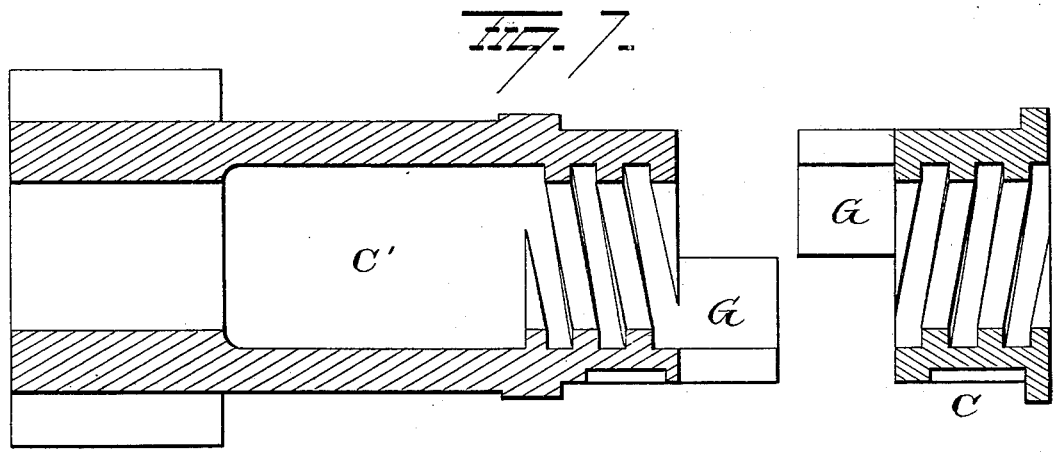
WITNESSES
E. J. Nottingham
G. F. Downing
INVENTOR
C. L. Taylor
By H. A. Seymour
Attorney
THE NORRIS PETERS CO., PHOTO-LITHO., WASHINGTON, D. C.

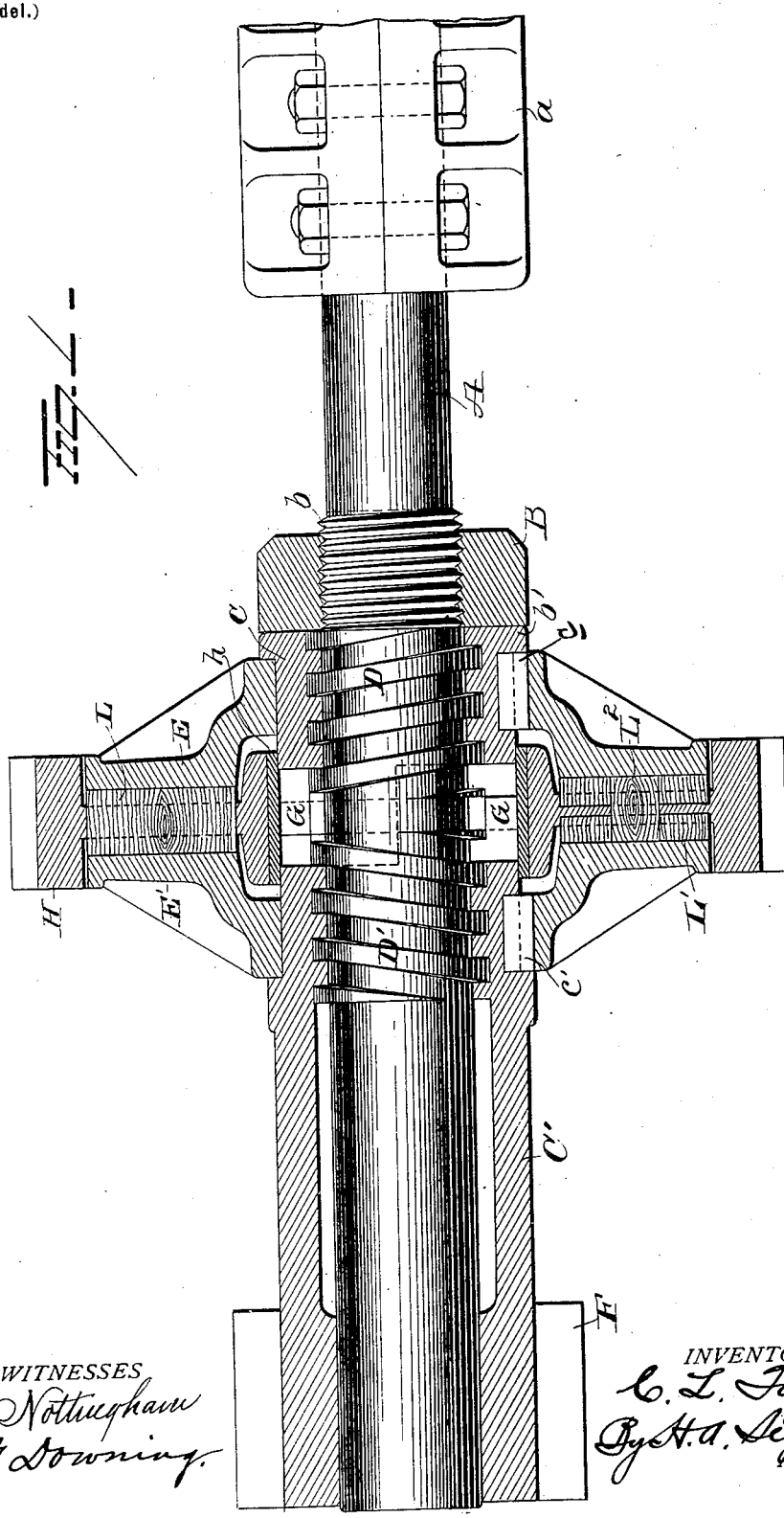

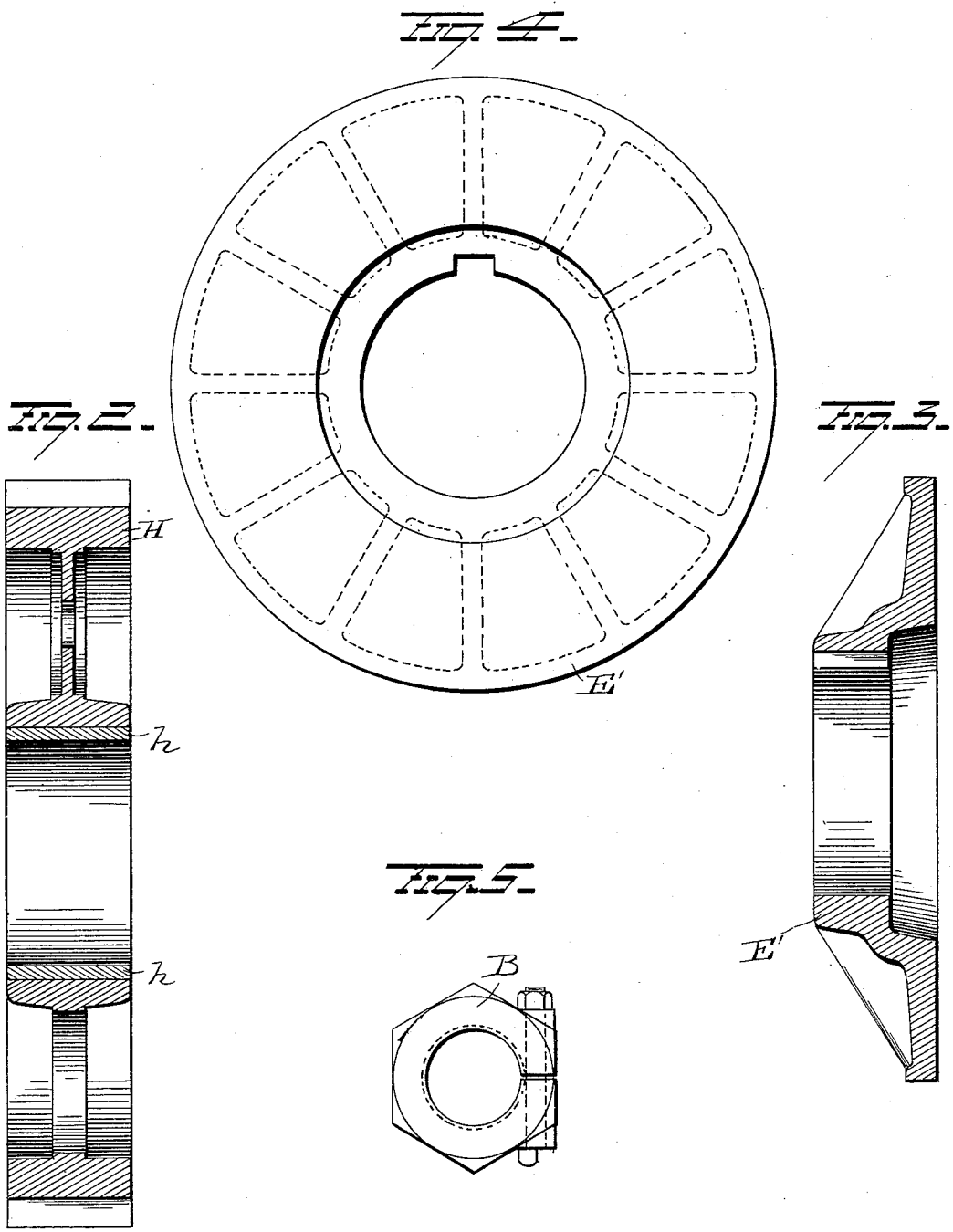

UNITED STATES PATENT OFFICE.

CLARENCE L. TAYLOR, OF ALLIANCE, OHIO, ASSIGNOR TO THE MORGAN ENGINEERING COMPANY, OF SAME PLACE.

CLUTCH FOR HOISTING-MACHINES.

SPECIFICATION forming part of Letters Patent No. 633,667, dated September 26, 1899.

Application filed June 19, 1899. Serial No. 721,109. (No model.)

*To all whom it may concern:*

Be it known that I, CLARENCE L. TAYLOR, of Alliance, in the county of Stark and State of Ohio, have invented certain new and useful Improvements in Clutches for Hoisting-Machines; and I do hereby declare the following to be a full, clear, and exact description of the invention, such as will enable others skilled in the art to which it appertains to make and use the same.

My invention relates to an improvement in clutches for hoisting-machines, and more particularly for overhead traveling cranes; and it consists in the parts and combinations of parts, as will be more fully described, and pointed out in the claims.

In the accompanying drawings, Figure 1 is a view, partly in section and partly in elevation, of my improved clutch. Fig. 2 is a view in cross-section of the ratchet. Fig. 3 is a section, Fig. 4 a view in elevation, of the friction-ring. Fig. 5 is a side view of the adjusting-nut. Fig. 6 is a view in elevation of the ratchet wheel and pawl, and Fig. 7 is a sectional view of the meeting ends of the two sleeves.

A represents a driving-shaft adapted to be coupled up to any suitable source of power and mounted in boxes a, only one of which, however, is shown. In overhead traveling cranes this shaft A would be geared up to the armature-shaft of the motor and would drive a hoisting-drum, and for the purpose of illustrating the operation of the clutch I will describe it as applied to the hoisting mechanism of an overhead traveling crane. This shaft A is provided with the screw-threaded section b, on which the adjusting-nut B is clamped. This nut is split, as shown in Fig. 5, and is provided with the bolt for clamping the split ends firmly to the shaft after the nut has been properly adjusted thereon with relation to the sleeve C.

The sleeve C is internally threaded to engage the right-hand threads D on the shaft A and is provided at its edge adjacent to the nut B with a peripheral flange $b'$, adapted to form a bearing or abutment for the friction ring or plate E. This ring or plate snugly embraces the sleeve C and is keyed thereto by the key c, so that the sleeve and friction-ring or plate E always turn in unison. The shaft A is also provided with the left-hand threads $D'$, adapted to engage the female threads on the sleeve $C'$, which latter is considerably longer than the sleeve C and is provided at its outer end with the teeth F, which latter mesh with a toothed wheel on the hoisting-drum. Sleeve $C'$ also carries a friction ring or plate $E'$, which latter is keyed to the sleeve by key $c'$.

The sleeves C and $C'$ are each provided on their adjacent ends with intermeshing teeth G, which latter permit the sleeves to move longitudinally on the shaft A toward and away from each other, but cause them to rotate in unison on or with shaft A.

Mounted on the adjacent ends of the sleeves C and $C'$ is the ratchet-wheel H, the hub of which is preferably provided with a bronze bushing h, resting in contact with the peripheries of the sleeves C and $C'$ at the adjacent ends. The ratchet-wheel thus mounted rests between the two friction rings or plates, and it will be seen that when the friction-rings are moved away from the ratchet-wheel, as is the case when unwinding or lowering the load, the ratchet-wheel is released and when released is engaged by a pawl M, of the usual form and construction, for preventing it from turning with the shaft while the latter is unwinding, and when the friction-rings are forced against the ratchet-wheel, as they are while the shaft is turning in a direction to wind up the load, the ratchet-wheel moves with the rings and with the shaft A and sleeves C and $C'$. The ratchet-wheel H is faced with wooden blocks, some of which, L, pass through the body of the wheel, while others, $L'$, are set into recesses in the body and are locked in place by the wooden keys $L^2$, passing through the body and through the oppositely-disposed blocks $L'$.

As before stated, the pinion F is in engagement with a toothed wheel on the hoisting-drum of the crane. Hence it will be seen that as the shaft is rotating in a direction to hoist the ring $E'$ is first forced by its sleeve $C'$, turning slightly on the screw $D'$, into contact with the friction-surface of the ratchet-wheel and the latter is forced into contact with the friction-ring E. It will now be seen that with the friction-rings in contact with the ratchet-wheel and the sleeves locked against longitudinal movement on the shaft a rotary motion of shaft A in a direction to hoist will be communicated to the hoisting-drum through the sleeve C'. It will also be seen that when there is a load suspended from the hoisting-drum the weight of said load tends to turn the sleeve C' on the screw and apply the friction-rings. Hence in hoisting and when the parts are not at rest the sleeves are locked to shaft A. To lower the load, the directions of rotation of the motor and the shaft A are reversed, and as a retrograde movement of the ratchet-wheel is prevented by the pawl previously referred to it will be seen that this reverse movement of the shaft tends to separate the sleeves C and C', and thus relieve the friction between the friction-rings and ratchet-wheel. As soon as the friction is relieved the sleeves C and C', with their respective friction-rings, turn with the shaft A; but as the load is on sleeve C' it will be seen that as soon as the friction is relieved sleeve C', which sustains the load, will begin to race. This racing movement is hardly noticeable, as the endwise movement of sleeve C' is very slight; but as it begins to race it is also moved endwise by the screw D' toward the ratchet-wheel, and is thus checked by the friction-ring E' being forced into contact with the friction-surface of the stationary ratchet-wheel. The continued movement of the shaft A again separates the sleeves, thus allowing sleeve C' to rotate in a direction to lower the load, and these movements are continued until the load has been deposited. With this construction it will be seen that in hoisting the friction-rings are always in contact with the friction-surfaces of the ratchet-wheel and are locked to shaft A, so as to rotate continuously therewith. In lowering the rotation of the shaft tends to and does move the sleeves C and C' longitudinally on the shaft, thus separating the clutching-surfaces; but as the weight of the load is on sleeve C' the weight tends to turn the sleeve faster than the shaft, which unequal movement, as before explained, moves the sleeve on the shaft and again applies the friction. These movements of the sleeve are in rapid succession and practically continuous, and hence are hardly noticeable to the eye.

It is evident that many slight changes might be resorted to in the relative arrangement and construction of parts herein shown and described without departing from the spirit and scope of my invention. Hence I would have it understood that I do not wish to confine myself to the exact construction herein shown and described; but, Having fully described my invention, what I claim as new, and desire to secure by Letters Patent, is—

1. In a clutch, the combination with a shaft having right and left hand threads, and threaded sleeves mounted on said shaft, each sleeve carrying a friction-ring, of a clutch-section interposed between the friction-rings and a pinion secured to one of said sleeves.

2. In a clutch, the combination with a shaft having right and left hand threads, female threaded sleeves mounted on said threaded shaft and provided with intermeshing tongues whereby they are caused to rotate in unison, a friction ring or plate carried by each sleeve, a clutch-section interposed between said friction-rings and means for locking said clutch-section against rotation in one direction.

3. In a clutch, the combination with a shaft having right and left hand threads, female threaded sleeves mounted on said threaded shaft, a friction-plate carried by each sleeve, and a pinion carried by one of said sleeves, of an adjusting-nut secured on the shaft for limiting the movement of one of said sleeves and a clutch-section interposed between the friction-rings.

4. In a clutch, the combination with a shaft having right and left hand threads, female threaded sleeves mounted on said shaft and having interlocking teeth in their adjacent ends, a pinion on one of said sleeves and an adjusting-nut secured on the shaft and forming an end bearing for one of said sleeves, of a clutch-section interposed between the friction-rings and means for holding the clutch-section against movement in one direction.

In testimony whereof I have signed this specification in the presence of two subscribing witnesses.

CLARENCE L. TAYLOR.

Witnesses:
DAVID FORDING,
A. W. BRIGHT.